United States Patent [19]
Condon et al.

[11] Patent Number: 5,444,777
[45] Date of Patent: Aug. 22, 1995

[54] BATTERY FEED FOR TELEPHONE LINE CARDS

[75] Inventors: Joseph H. Condon, Summit; Gabriel L. Miller, Westfield, both of N.J.

[73] Assignee: AT&T Corp., Murray Hill, N.J.

[21] Appl. No.: 174,117

[22] Filed: Dec. 28, 1993

[51] Int. Cl.6 .......................................... H04M 19/00
[52] U.S. Cl. ................................... 379/413; 379/399; 379/402; 379/403
[58] Field of Search ............... 379/413, 399, 402, 403, 379/377, 370; 335/105, 106, 107

[56] References Cited

U.S. PATENT DOCUMENTS 4,539,438  9/1985  Rosenbaum et al. ............... 479/413
5,274,704  12/1993  Jakab .................................. 379/402

Primary Examiner—James L. Dwyer
Assistant Examiner—Jacques M. Saint-Surin

[57] ABSTRACT

A battery feed circuit for supplying DC power to a telephone loop and for coupling signals to and from said loop is disclosed. A differential amplifier having its inputs connected by way of a twisted resistive bridge to the telephone loop provides a voltage at its output which includes the signal from said telephone loop and has a DC component which is proportional to the DC current flowing in the loop. Signals are coupled to the telephone loop by a low-inductance three-winding transformer which has two of its windings connected in series with an external power supply and the twisted bridge in order to supply current to the telephone loop. A second differential amplifier is connected in different ways in several embodiments between the output of the first differential amplifier and the third winding of the transformer to provide an automatic flux-cancelling action in order to avoid saturation of the transformer core. Larger gain is achieved in the first differential amplifier by clamping its DC output to zero through use of an integrator circuit connected between the output and one of the inputs of the first differential amplifier. In one of the embodiments, power is supplied to the telephone loop by a constant current source.

12 Claims, 6 Drawing Sheets

BATTERY FEED FOR TELEPHONE LINE CARDS

FIELD OF THE INVENTION

This invention relates to telephone line cards and more particularly to telephone line cards which use a series transformer to provide drive to the telephone line.

DESCRIPTION OF THE RELATED ART

One of the earliest and most widely used methods employed to provide signal and power to the telephone line is to utilize a split-winding transformer. See the text entitled "Digital, Analog, and Data communications: A Resource Book", by W. Sinnema and T. McGovern, Prentice Hall, 1986. In these circuits, the transformer both provides the DC power and couples the AC (voice) signals to and from the subscriber's line. While this scheme proved immensely successful, it required large transformers. This occurred because winding inductances of about 1 henry were employed, while the DC loop current could be as high as 100 ma. The resulting flux tended to saturate any but very large magnetic cores. The next improvement made use of an auxiliary flux cancelling winding on the transformer. By passing a current through this auxiliary winding, the core could be kept out of saturation.

In parallel with the development of circuits which used transformers, purely electronic circuits without transformers have been also devised and are widely used at this time. However, the electronic circuits without transformers have not proved to be the most cost effective.

It is well known that transformer coupled systems are limited at the low frequency end by their magnetizing inductance and the associated (L/R) ratio where L is the magnetizing inductance and R is the associated resistance. Large (L/R) ratios are desirable, but as indicated hereinabove, a large inductance is not only expensive but can also result in transformer core saturation. We have noted that a high (L/R) ratio can also be obtained even when using very few turns (and therefore a low inductance) providing that the value of R is sufficiently small. Our present invention is based on the conclusion that it is advantageous to use small inductances running into (or out of) short circuits rather than large inductances running into (or out of) high impedances in telephone line circuits, and furthermore that flux cancellation can be achieved without the need for any auxilliary winding on the transformer.

SUMMARY OF THE INVENTION

A low cost battery feed for a telephone line card is provided in accordance with the present invention wherein each one of two windings of a three winding transformer is connected in series with a load resistor to each side of the telephone loop. A first amplifier circuit is coupled to sense the voltage across each of the load resistors and provide at its output a voltage which is a function of the total current in the telephone line including the transmit signal component on the telephone line. A second amplifier circuit has its input connected both to the output of the first amplifier and to the receive signal to be coupled to the telephone line. The output of the second amplifier is coupled to the third winding of the transformer thereby coupling the receive signal to the telephone line and driving the third winding with a current that is proportional to the current in the telephone line. As a result, the second amplifier circuit provides an automatic flux-cancelling action without the use of any auxiliary winding.

It is an aspect of the present invention that the second amplifier also couples a signal component back to the input of the battery feed in a feedback arrangement in order to adjust the input impedance provided to the telephone loop.

In one embodiment of the present invention the second amplifier function is provided by a low cost differential amplifier driving a transistor which in turn drives the third winding of the transformer.

In another embodiment of the invention, a higher level signal component is provided at the output of the first amplifier circuit by advantageously using a third amplifier in an integrator circuit arrangement to hold the output of the first amplifier to zero for DC and low frequency components. As a result, the gain of the differential amplifier can be increased since the desired output signal can be much larger before the signal reaches the limit set by the supply voltage to the amplifier.

In still another embodiment, power consumption of the battery feed circuit is reduced and a protection against tip-to ring shorts is achieved by supplying power to the telephone loop through a constant current supply.

BRIEF DESCRIPTION OF THE DRAWING

FIG. 6 is also a schematic diagram of a battery feed for a telephone line card circuit constructed in accordance with the present invention.

DESCRIPTION OF THE PREFERRED EMBODIMENT

Figure 1:
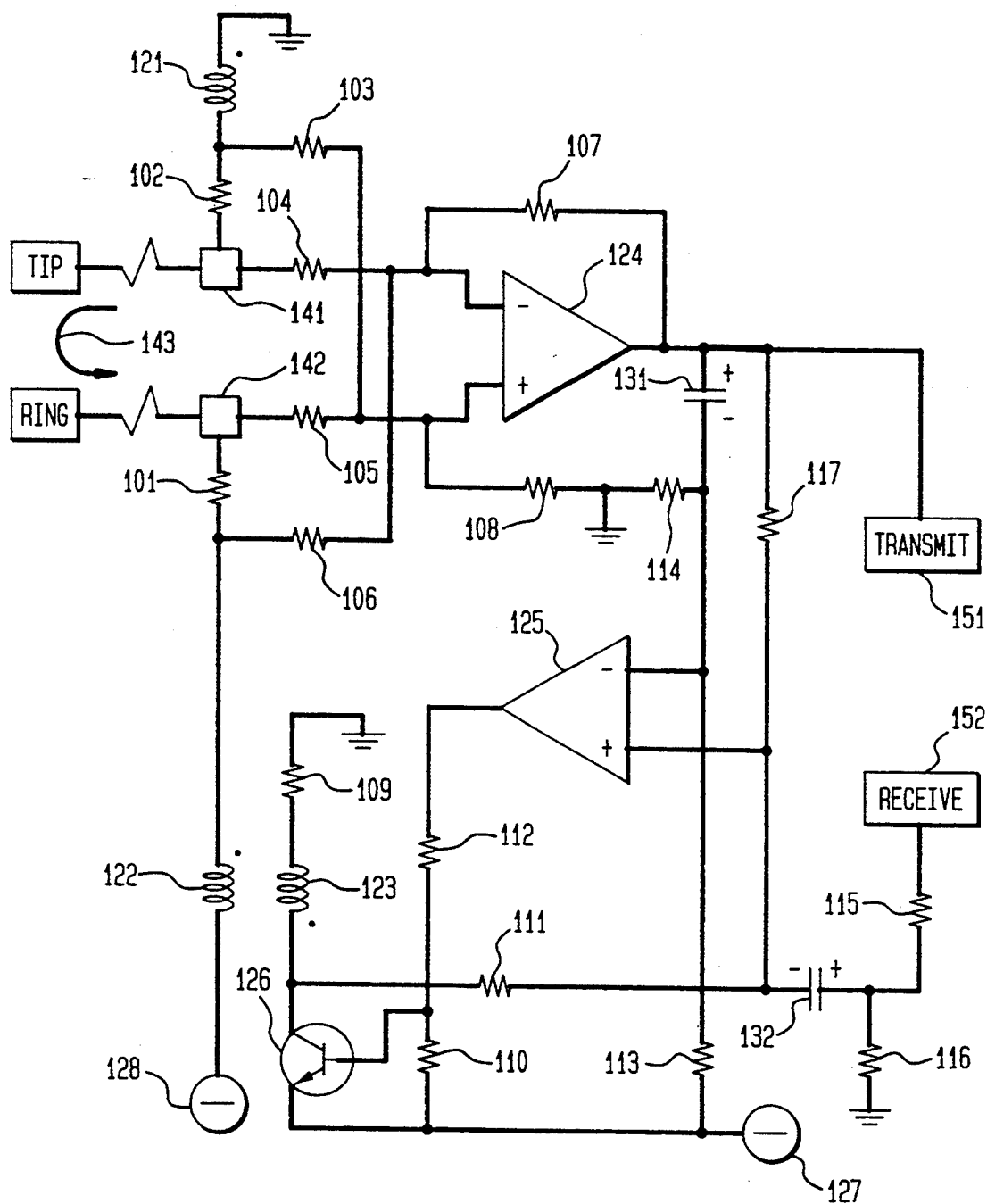
FIGS. 1 through 4 are schematic diagrams of battery feeds for line card telephone circuits constructed in accordance with the present invention.

In FIG. 1, current from ground flows through winding 121 of a low-inductance three-winding transformer to a junction of resistors 102 and 103. Resistor 102 to be discussed hereinbelow is in the order of several hundred ohms whereas resistor 103 and resistors 104–106 are about one thousand times the value of resistor 102. Hence, substantially all of the current from winding 121 flows through resistor 102 by way of a terminal 141 through a loop 143 to the tip side of the telephone handset. This current on telephone loop 143 flows from the ring side of the telephone handset by way of a terminal 142 to a junction of resistors 101 and 105. Resistor 101 is generally equal to the value of resistor 102, and resistors 103–106 are generally equal in value to each other. The current from telephone loop 143 flows through resistor 101 and a second winding 122 of the low-inductance three-winding transformer to a terminal 128. Normally, terminal 128 is connected to a −48 volt supply.

Resistors 103 and 105 are connected in series across resistor 102 and the load provided by telephone loop 143. Similarly, resistors 104 and 106 are connected in series across telephone loop 143 and resistor 101. The junction of resistors 103 and 105 is connected to (+) input of differential amplifier 124, and the junction of resistors 104 and 106 is connected to the (−) input of amplifier 124. A resistor 107 is connected in a standard feedback arrangement from the output of amplifier 124 to the (−) input in order to provide negative feedback stabilization of changes which otherwise would occur due to variations of the components within amplifier 124, and a resistor 108, equal in value to resistor 107 is connected between the (+) input of amplifier 124 and ground in order to provide a balanced input impedance to amplifier 124. The output of amplifier 124 provides a transmit signal from the telephone loop 143 on an output terminal 151. Amplifier 124 and the other amplifiers to be described hereinafter require a supply of power to function, but these sources of power have not been shown in the figures in order to improve clarity of the drawings.

In many prior art battery feed circuits, resistors 103 and 106 are not present, and the output of their corresponding amplifiers is a voltage proportional to the voltage difference between tip and ring. This voltage, between tip and ring, has a DC value anywhere from 48 volts to essentially zero, depending on the loop resistance and the value of the feed resistors 102 and 101. Superimposed on this is the small AC signal of interest, typically corresponding to a current of about 1 ma., or much less, flowing into the load resistors.

By the addition of the resistors 103 and 106, we have created what is known to those skilled in the art as a "twisted bridge". Examination of the present arrangement reveals that the output of differential amplifier 124 is a voltage proportional to the total current flowing in the telephone loop 143 and to the value of resistors 102 and 101. The output of the amplifier is advantageously independent of the voltage drop across the load provided by the telephone loop 143. Intuitive appreciation of this fact can be obtained from observing that the voltage drop across the loop contributes equally to both the (+) and (−) inputs of differential amplifier 124, and therefore the effect of the voltage drop across the telephone loop is cancelled in the amplifier.

Many decades of history dictate that the telephone loop battery voltage applied to terminal 128 shall be minus 48 volts and that the minimum loop current shall be 20 ma. This implies that the maximum total DC loop resistance cannot exceed 2400 ohms, including the feed resistors 102 and 101. It is also the case that the longest loops usually used in practice are of about 2000 ohms and this length is primarily set by issues of attenuation and filtering. This implies that if the simplest approach is taken, namely that of using two feed resistors, 101 and 102, to supply tip and ring, these resistors can be no more than 200 ohms each if maximum length loops are to be accommodated. If however, the loop is very short, these low values for feed resistors 102 and 101 can result in a DC loop current that is very high in the order of about 80 ma. or more. All of this current inevitably flows in windings 121 and 122 (series adding), and the current therefore tends to saturate the transformer core.

As pointed out hereinabove, the output voltage of amplifier 124 is proportional to the current in loop 143. This output voltage is coupled by way of a resistor 117 to the (+) input of a differential amplifier 125. The (−) input of amplifier 125 is provided with a small negative voltage by the fact that it is connected to the function of series resistors 113 and 114 which in turn are connected between a negative voltage supply on terminal 127 and ground. The output of amplifier 125 is connected through a resistor 112 to the base input of an NPN transistor 128 and to a resistor 110 which has its other end connected to the negative supply on terminal 127. A resistor 111 connected between the collector of transistor 126 and the (+) input of amplifier 125 provides negative feedback stabilization. The emitter of transistor 126 is connected to the negative voltage supply on terminal 127 and its collector is connected to one end of a third winding 123 of the low-inductance three-winding transformer. The other end of this winding 123 is connected through a resistor 109 to ground. As a result, the small negative voltage on the (−) input of amplifier 125 causes transistor 126 to be placed into conduction and cause a standing current to flow in winding 123. As a result of this standing current, AC signaling can be coupled through the transformer to the loop 143 even when the telephone handset is on-hook and the loop is open.

The windings are polled such that the transistor 126 collector current flowing in winding 123 intentionally produces a magnetomotive force that subtracts from that due to the loop current flowing in windings 121 and 122, that is this current in winding 123 produces a flux-cancelling effect. Furthermore the magnitude of this flux-cancellation is constantly and automatically adjusted by simply servoing the collector current to follow the amplifier 124 output voltage (which as pointed out hereinabove is itself directly proportional to the loop current).

The output of amplifier 124 is also connected through a capacitor 131 to the (−) input of amplifier 125 thereby providing a feedback arrangement which drives windings 121 and 122 in such a way as to raise the dynamic source impedance presented to the telephone loop to 600 ohms. Without such feedback the source impedance (where resistors 102 and 101 are equal to 200 ohms each) would be equal to 400 ohms, and would not be equal to the required 600 ohms.

The signals on a receive terminal 152 are coupled through a voltage divider network consisting of resistors 115 and 116 and through a capacitor 132 to the (+) input of amplifier 125. As a result, these signals are coupled through a very low source impedance to winding 123 and thereby through to the telephone loop 143.

There are a number of situations where it is not necessary to drive long loops. One example is that of Subscriber Loop Carrier (SLC) systems in which the loops tend to be short and in addition minimization of both the on-hook and off-hook power dissipation become of paramount importance. Such situations can be served by the battery feed circuit shown in FIG. 2.

Figure 2:
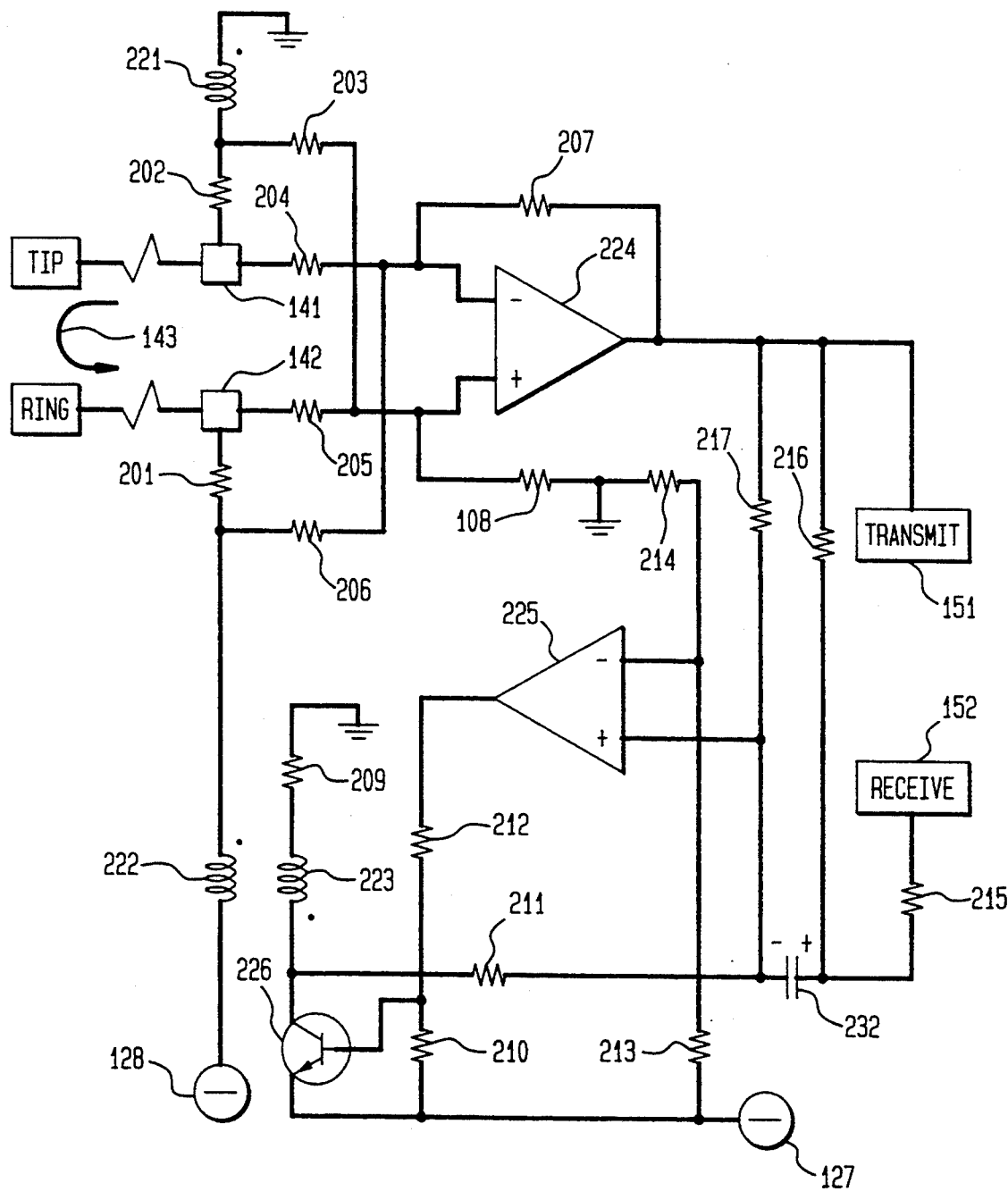

In circuit of FIG. 2, all of the components with numerical designations having identical tens and units digits to those in FIG. 1 perform similar functions to the corresponding components in FIG. 1, and a description of their operation need not therefore be repeated. The values of the feed resistors 202 and 201 however, have been increased to about 500 ohms each to reduce the current drain for the shortest loops. This in turn dictates that the phase of the feedback from amplifier 224 to winding 223 be shifted by 180° to produce a subtracting effect on resistors 202 and 201 so as to maintain a 600 ohm dynamic input impedance. This is achieved by removing capacitor 131 (in FIG. 1) and instead connecting a resistor 216 between the output of amplifier 224 and capacitor 232 in place of the resistor 116 (in FIG. 1) to ground. Together with some gain changes, and a reduction in the transformer turns ratio, this results in the circuit of FIG. 2.

Figure 3:
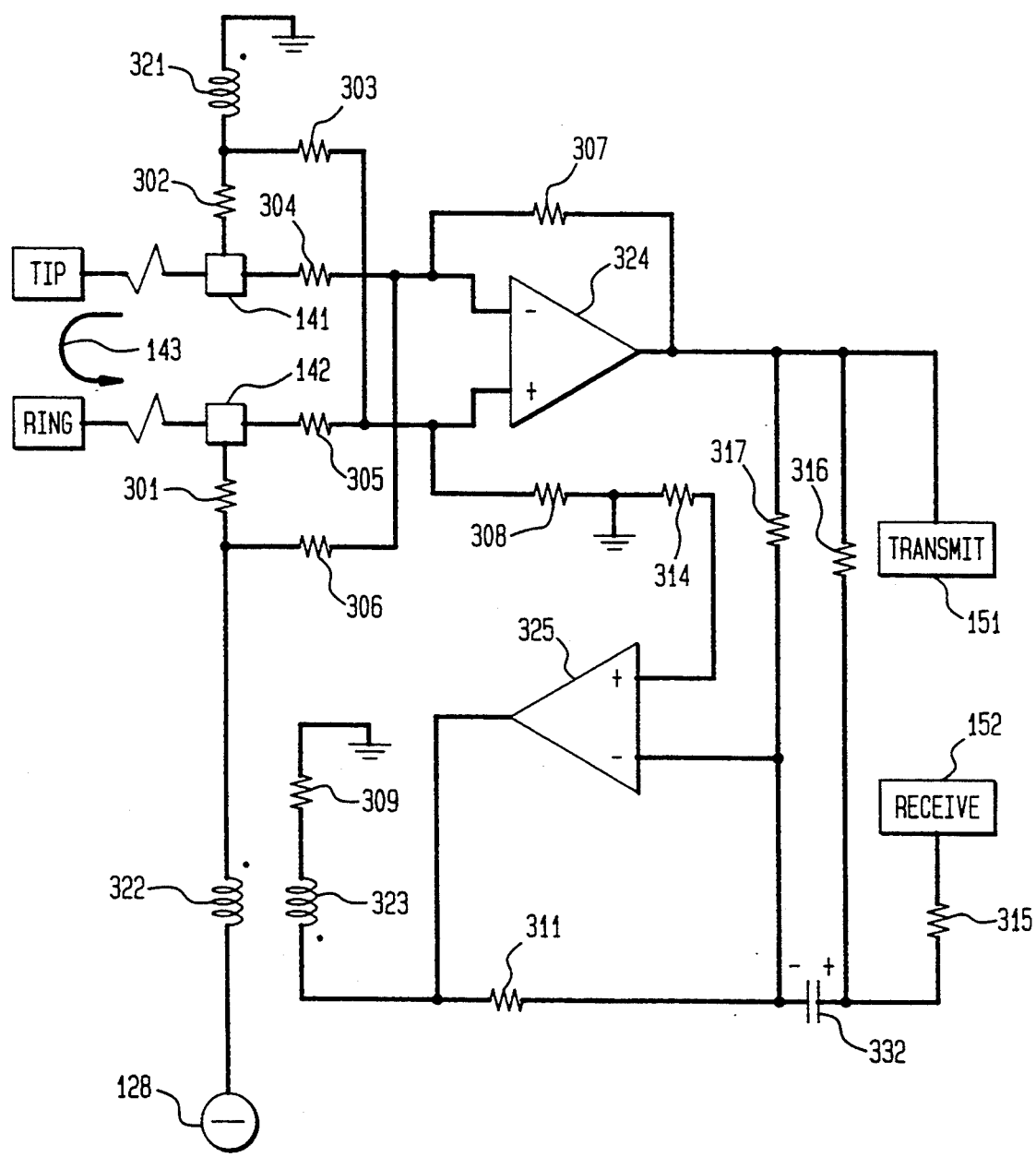

If the standing current which is established in transistor 226 results in an unacceptably high power expenditure, amplifier 225 can be upgraded to one which has sufficient drive capability such that its output can be connected directly to the third winding of the transformer. This type of circuit is illustrated in FIG. 3 which is very similar to the circuit of FIG. 2 except that transistor 226 has been eliminated and an amplifier 325 has its output directly connected to winding 323. Here again all components with numerical designations having identical tens and units digits to the components in FIG. 1 perform the same functions as those in FIG. 1 and a description of those functions need not be repeated. It should be noted however that the (−) and (+) inputs of amplifier 325 are switched relative to those shown in FIG. 2 since the 180° phase shift previously provided by transistor 226 is no longer present. As a result, the standing current can be considerably reduced yielding a much lower on-hook power dissipation.

In the circuits of FIGS. 1–3, the transimpedance for both the DC loop current and the audio signal are the same, and the value may be much lower than that which is required in some cases. The higher gain can of course be provided by an AC coupled amplifier following amplifier 324. A particularly attractive and novel way to achieve the higher transimpedance is shown in FIG. 4 wherein the component elements having identical functions are given numerical designations identical to the elements in FIG. 3.

Figure 4:
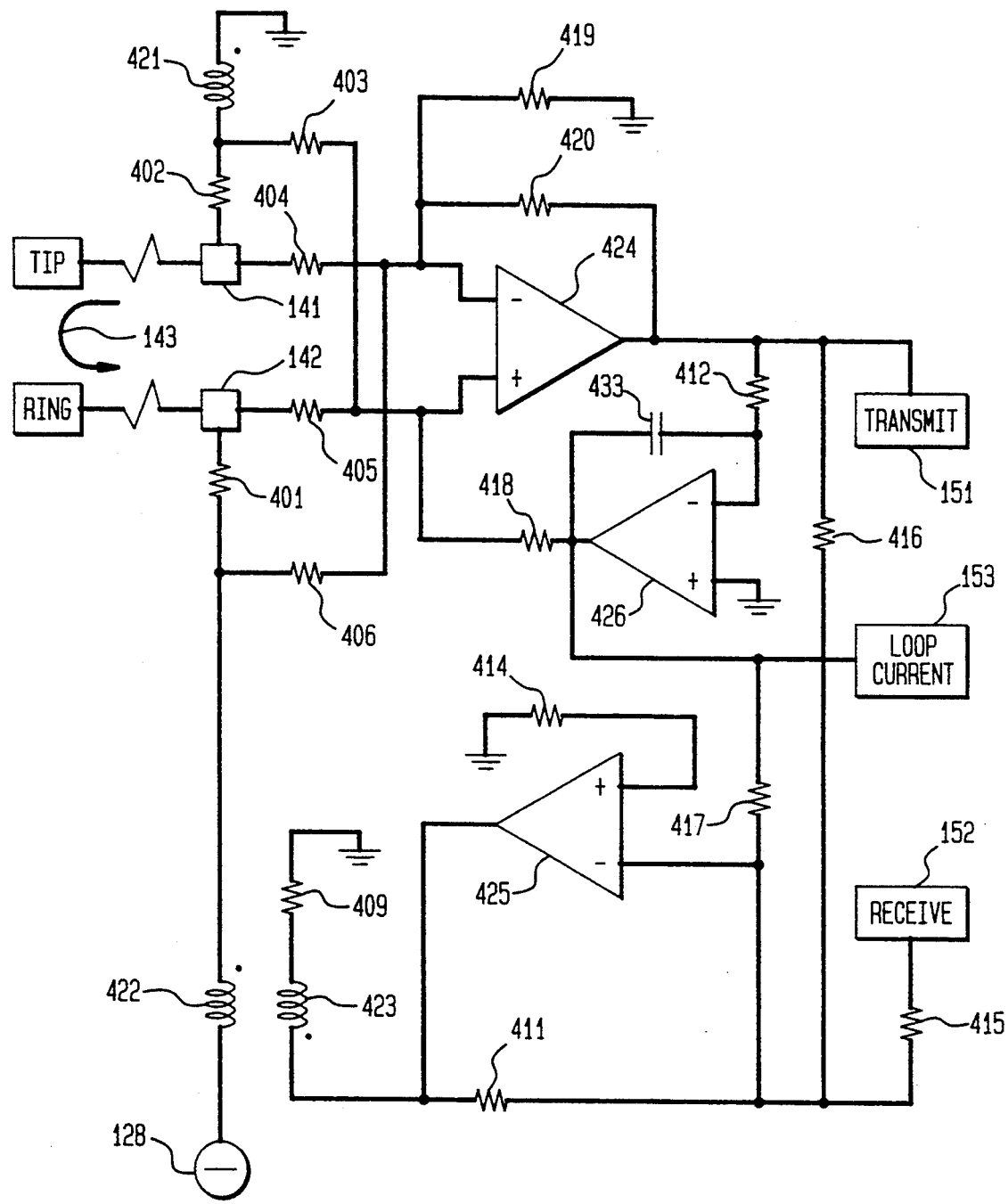

In FIG. 4, the output of amplifier 424 has its average DC output voltage held at ground by the action of an integrator circuit consisting of resistor 412, amplifier 426 and capacitor 433. The element values of the integrator are chosen such that low frequency signals (including DC) that are not necessary to the information being transmitted to transmit terminal 151 are coupled to the input of amplifier 426. If the information is speech, the pass band of the integrator circuit can be set to about 100 Hz. The output of amplifier 426 is connected through a resistor 418 to the (+) input of amplifier 424. Any departure of the DC output of amplifier 424 causes the integrator to return the output to zero by changing the voltage at the (+) input of amplifier 424. The value of resistor 418 is chosen to equal the value of resistors 419 and 420 in parallel thereby ensuring equal input impedances. Since the DC component is extracted from the output of amplifier 424 by the integrator circuit, the entire amplifier circuit is now a high frequency pass circuit where the voice signal component at the output of amplifier 424 can be permitted to swing through the entire range of voltage provided by the power supply to the amplifier. As a result, the gain of amplifier 424 can be increased relative to that of amplifier 324 in FIG. 3 and a larger voice signal component is available at the transmit terminal 151.

A voltage which represents the loop current is available on terminal 153 in FIG. 4 at the output of amplifier 426. Resistor 417 connects this output to the negative input of amplifier 425 in order to achieve the desired amount of flux-cancellation in winding 423. In addition, since the output of amplifier 424 is clamped to zero at DC, there is no longer any necessity in FIG. 4 for any capacitor equivalent to capacitor 332 in FIG. 3. Accordingly, receive input 152 is connected through resistor 415 directly to the negative input of amplifier 425.

As in all resistively supplied battery feeds there exists a potential problem arising from a tip-to-ring short or ring-to-ground short. In the hereinabove described circuits the voltage representing the loop current can be sensed in order to detect excess loop current and a ring relay (not shown) can be used to disconnect the battery feed from the line. Still other techniques may be used such as the addition of simple series-connected bimetallic strip to the back of the feed resistor where the feed resistor is a high power resistor. Finally, there is the option provided in the novel arrangement shown in FIGS. 5 and 6 wherein the whole of the battery feed is provided by a constant current source. Operating at constant current not only automatically solves all tip-to-ring or ring-to-ground short problems, but also offers a large off-hook power saving on short loops.

Figure 5:
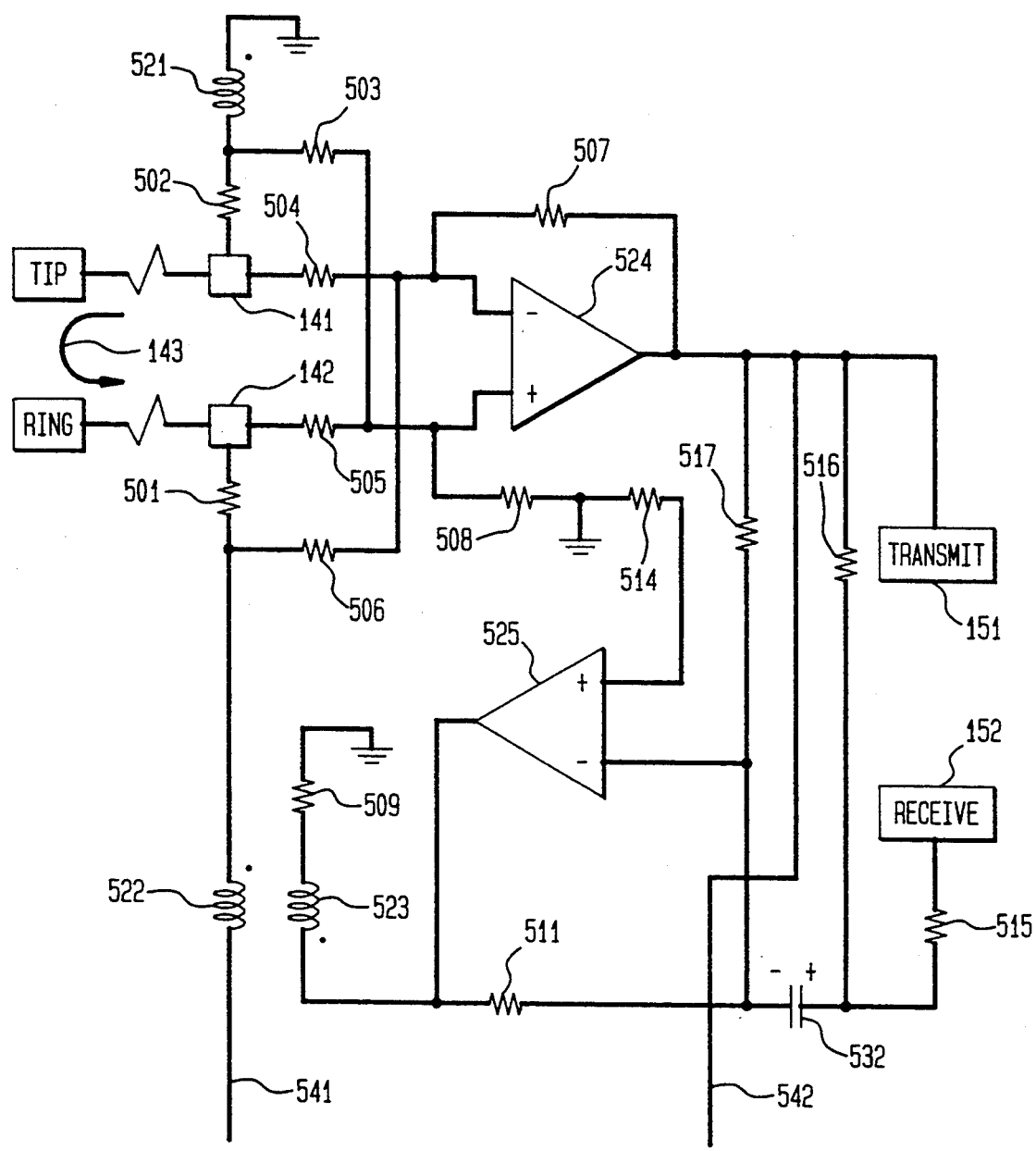
FIGS. 5 and 6 when placed with FIG. 5 above
Figure 6:
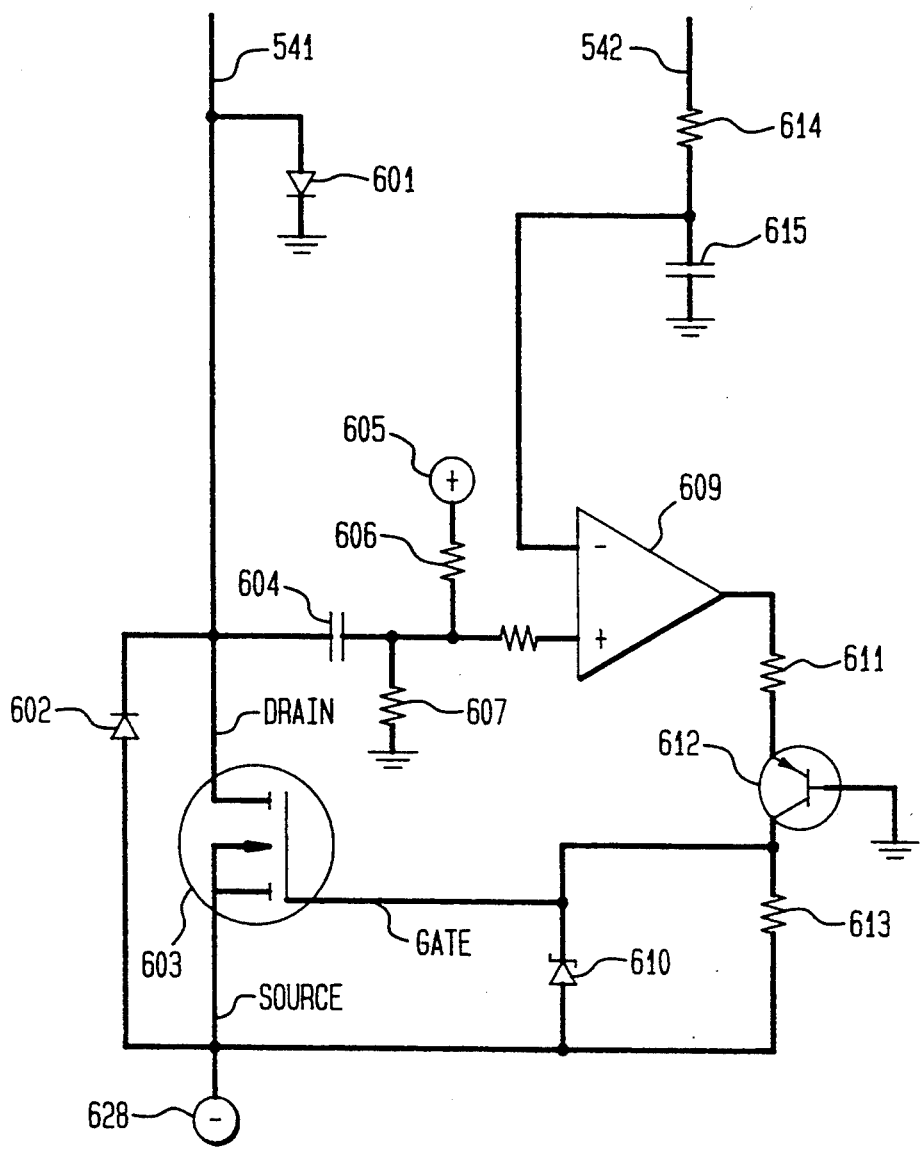

FIG. 5 when placed above FIG. 6 with lines 541 and 542 in each figure connecting provides a circuit diagram of a battery feed line circuit wherein the battery feed provided by way of terminal 128 in FIG. 3 is replaced with the constant current source of FIG. 6. All of the elements in FIG. 5 with numerical designations having identical units and tens digits to the elements of FIG. 3 operate in a functional equivalent manner to the elements of FIG. 3. Accordingly, no further description of the elements of FIG. 5 are necessary.

As pointed out hereinabove, the voltage at the output of amplifier 524 is proportional to the current in the telephone loop 143. For example, with the minimum current of 20 ma. in the loop and a transimpedance of 80 ohms for the amplifier circuit involving amplifier 524, a voltage of 1.6 volts DC will be present on line 542 which is connected to the output of amplifier 524. In FIG. 6, resistors 607 and 606 are connected in series between ground and terminal 605 to which a positive voltage source is connected. The junction of resistors 606 and 607 is connected by way of a resistor 608 to the (+) input of an operational amplifier 609. The values of the resistors 606 and 607 are chosen such that a potential is presented to the (+) input of amplifier 609 equal in value to the potential on line 542 which corresponds to the desired current on line 541. The output of amplifier 609 is connected through a resistor 611 to the emitter of a PNP transistor 612. The base of transistor 612 is connected to ground and its collector is connected directly to the gate of a metal oxide semiconductor field effect transistor (MOSFET) 603 and through a resistor 613 to a terminal 628 to which a negative potential can be connected. The drain of MOSFET 603 is connected directly to line 541 and its source is connected to terminal 628. The positive potential at the (+) input of amplifier 609 causes transistor 612 to conduct and turn ON MOSFET 603 thereby resulting in a current from line 541 toward terminal 628.

A low pass filter consisting of a the series combination of a resistor 614 and a capacitor 615 is connected between line 542 and ground. The DC component developed on line 542 is present at the junction of resistor 614 and capacitor 615 and is coupled to the (−) input of amplifier 609. When the current on line 541 reaches the desired level, the potential at the (−) input of amplifier 609 matches the potential provided to its (+) input and entire feedback loop balances thereafter holding the loop current constant. Furthermore, the net DC flux in the three winding transformer core is always precisely zero.

Line 541 is also connected through a capacitor 604 to the (+) input of amplifier 609. The value of capacitor 604 is chosen along with the values of resistors 606 and 607 such that the audio impedance at the drain of MOSFET 603 is extremely low by virtue of the fast AC feedback through capacitor 604 to the (+) input of amplifier 609. This ensures that the entire audio performance of the system (within the telephone band) is undisturbed and behaves precisely as before in FIG. 3. At DC and up to the frequencies set by the time constant established by elements 604, 606 and 607, the drain of MOSFET 603 behaves like a constant current source.

A diode 601 has its anode connected to line 541 and its cathode connected to ground in order to bypass positive voltage spikes on line 541 to ground. Similarly, a diode 602, having its cathode connected to line 541 and its anode connected to terminal 628, couples negative voltage spikes on line 541 to the negative voltage supply. A Zener diode 610 has its cathode connected to the gate of MOSFET 603 and its anode connected to the source of MOSFET 603 in order to limit the potentials applied between the source and the gate.

What has been described hereinabove are illustrative embodiments of the present invention. Numerous departures may be made by those skilled in the art without departing from the spirit and scope of the present invention. For example, other forms of current sources may be used in place of the one shown in FIG. 6. In addition, other circuits may be used to generate a voltage proportional to the current in the telephone loop. For example, a differential amplifier can be connected to each of the feed resistors, and the outputs of the amplifiers can be combined to provide a voltage proportional to the current in the loop.

What is claimed is:

1. A circuit for coupling an external power supply to a telephone loop and for coupling said telephone loop to the circuit output and the circuit input, said circuit comprising first and second feed resistors, means for coupling said telephone loop in series between said first and second feed resistors, a transformer having first, second and third windings each one of which has a first and second terminal, said first winding having one terminal connected to said first feed resistor and the other terminal connected to receive one polarity of said external power supply, said second winding having one terminal connected to said second feed resistor and the other terminal connected to receive the other polarity of said external power supply, a first amplifier means responsive to voltages developed across said first and second feed resistors for generating an output voltage which is proportional to the total current in said telephone loop, means for connecting the output of said first amplifier means to said circuit output, second amplifier means for coupling the output of said first amplifier means to said third winding of said transformer, and means for coupling said circuit input to said second amplifier means.

2. A circuit as defined in claim 1 wherein said second amplifier means includes a differential amplifier having positive and negative inputs and an output, a transistor having a base, emitter and collector electrodes, means for connecting said emitter and collector electrodes in series with said third winding and an external power supply, means for coupling the output of said differential amplifier to said base electrode, and means for DC coupling the positive input of said differential amplifier to the output of said first amplifier means.

3. A circuit as defined in claim 2 wherein said second amplifier means further includes a capacitor means for coupling signals at the output of said first amplifier means to the negative input of said differential amplifier.

4. A circuit as defined in claim 2 wherein said means for coupling said circuit input to said second amplifier means includes means for coupling an AC signal from the output of said first amplifier means to the positive input of said differential amplifier.

5. A circuit as defined in claim 1 wherein said second amplifier means includes a differential amplifier having positive and negative inputs and an output, means for DC coupling the output of said first amplifier means to the negative input of said differential amplifier, means for directly coupling the output of said differential amplifier to one terminal of said third winding, and means for connecting the other terminal of said third winding to a ground potential.

6. A circuit as defined in claim 1 wherein said first amplifier means includes a differential amplifier having two inputs, first and second resistive potential dividers each having two substantially equal resistors connected in series, means for connecting said first resistive potential divider across said first feed resistor and said telephone loop, means for connecting said second resistive potential divider across said telephone loop and said second feed resistor, means for connecting the junction between said substantially equal resistors in said first potential divider to one of said two inputs of said differential amplifier, and means for connecting the junction between said substantially equal resistors in said second potential divider to the other one of said two inputs of said differential amplifier.

7. A circuit as defined in claim 1 wherein said first amplifier means includes first and second differential amplifiers each having positive and negative inputs and an output, means for coupling the positive and negative inputs of said first differential amplifier to both ends of said first and second feed resistors, a capacitor having one terminal connected to the negative input of said second differential amplifier and its other terminal connected to the output of said second differential amplifier, a resistor having one end connected to the negative input of said second differential amplifier and the other end connected to the output of said first differential amplifier, means for DC coupling the output of said second differential amplifier to the positive input of said first differential amplifier in a negative feedback arrangement whereby the output of said first differential amplifier is clamped to approximately zero DC voltage, said means for connecting the output of said first amplifier means to said circuit output being connected to the output of said first differential amplifier, and means for coupling the outputs of said first and second differential amplifiers to said second amplifier means.

8. A circuit as defined in claim 7 wherein said means for coupling the positive and negative inputs of said first differential amplifier to both ends of said first and second feed resistors includes first and second resistive potential dividers each having two substantially equal resistors connected in series, means for connecting said first resistive potential divider across said first feed resistor and said telephone loop, means for connecting said second resistive potential divider across said telephone loop and said feed second resistor, means for connecting the junction between said substantially equal resistors in said first potential divider to the negative input of said first differential amplifier, and means for connecting the junction between said substantially equal resistors in said second potential divider to the positive input of said first differential amplifier.

9. A circuit for supplying DC current to a telephone loop from an external power supply and for coupling signals to and from said telephone loop to a transmit output and a receive input, said circuit comprising first and second feed resistors, terminal means for connecting said telephone loop in series between said first and second feed resistors, a transformer having first, second and third windings each one of which has a first and second terminal, said first and second windings each having one terminal connected respectively to said first and second feed resistors such that a series combination of a winding and a feed resistor is connected to each side of said telephone loop, the other terminal of said first winding being connected to one polarity of said external power supply, a first amplifier means responsive to the voltages developed across said first and second feed resistors for generating an output voltage which is proportional to the total current in said telephone loop, means for connecting the output of said first amplifier means to said transmit output, second amplifier means for coupling the output of said first amplifier means to said third winding of said transformer, means for coupling said receive input to said second amplifier means, and means connected to the other polarity of said external power supply and responsive to the output of said first amplifier means for supplying a constant current to the other terminal of said second winding.

10. A circuit as defined in claim 9 wherein said second amplifier means includes a differential amplifier having positive and negative inputs and an output, means for DC coupling the output of said first amplifier means to the negative input of said differential amplifier, means for directly coupling the output of said differential amplifier to one terminal of said third winding, and means for connecting the other terminal of said third winding to a ground potential.

11. A circuit as defined in claim 9 wherein said first amplifier means includes a differential amplifier having two inputs, first and second resistive potential dividers each having two substantially equal resistors connected in series, means for connecting said first resistive potential divider across said first resistor and said telephone loop, means for connecting said second resistive potential divider across said telephone loop and said second resistor, means for connecting the function between said substantially equal resistors in said first potential divider to one of said two inputs of said differential amplifier, and means for connecting the junction between said substantially equal resistors in said second potential divider to the other one of said two inputs of said differential amplifier.

12. A circuit as defined in claim 9 wherein said means for supplying a constant current to the other terminal of said second winding includes a differential amplifier having positive and negative inputs and an output, integrator means for coupling the DC potential present at the output of said first amplifier means to the negative input of said differential amplifier, resistance divider means connected to an external source of positive potential for providing a predetermined voltage to the positive input of said differential amplifier, the predetermined potential being substantially equal to the DC potential present at the output of said first amplifier means when the desired amount of current is flowing in said telephone loop, a MOSFET having source, drain and gate electrodes, said source electrode being connected to the other polarity of said external power supply, said drain electrode being connected to the other terminal of said second winding, and means for coupling the output of said differential amplifier to the gate electrode of said MOSFET.

* * * * *